(12) United States Patent
Chou

(10) Patent No.: US 10,368,498 B1
(45) Date of Patent: Aug. 6, 2019

(54) NATURAL LIGHT GUIDING SYSTEM USED FOR PLANT CULTIVATION

(71) Applicant: B.T.G INT. CO., LTD., Taichung (TW)

(72) Inventor: Hsien-I Chou, Taichung (TW)

(73) Assignee: B.T.G INT. CO., LTD., Taichung (TW)

( * ) Notice: Subject to any disclaimer, the term of this patent is extended or adjusted under 35 U.S.C. 154(b) by 0 days.

(21) Appl. No.: 16/055,681

(22) Filed: Aug. 6, 2018

(51) Int. Cl.
*A01G 7/04* (2006.01)
*F21V 1/04* (2006.01)
*F21V 8/00* (2006.01)
*F21Y 115/10* (2016.01)

(52) U.S. Cl.
CPC .................. *A01G 7/045* (2013.01); *F21V 1/04* (2013.01); *G02B 6/003* (2013.01); *F21V 2200/10* (2015.01); *F21Y 2115/10* (2016.08)

(58) Field of Classification Search
CPC .......... A01G 7/04; A01G 7/045; A01G 24/00; A01G 24/18; A01G 24/48; A01G 31/02; A01G 31/04; A01G 31/045; A01G 31/047; A01G 31/06; A01G 1/02; A01G 31/042; G02B 6/003; F21V 1/04; F21V 2200/10; F21V 1/00; F21V 1/02; F21V 15/01; F21Y 2115/10
See application file for complete search history.

(56) References Cited

FOREIGN PATENT DOCUMENTS

GB 611673 * 11/1948 .............. F21V 15/01
KR 20140040901 A * 4/2014

* cited by examiner

*Primary Examiner* — Anh T Mai
*Assistant Examiner* — Glenn D Zimmerman
(74) *Attorney, Agent, or Firm* — Egbert Law Offices, PLLC

(57) ABSTRACT

A natural light guiding system used for plant cultivation includes a chasing light and collecting light device and at least one lighting device connected to the chasing light and collecting light device. The at least one lighting device includes a lampshade is hollow and cone-shaped. A top plate is mounted to a top of the lampshade. At least one optical fiber is connected to the chasing light and collecting light device. At least one collecting lens barrel is disposed on the top of the lampshade and projects light into the lampshade. A free ends of the at least one optical fiber is connected to the at least one collecting lens barrel. At least one LED light source is mounted onto an inner periphery of the lampshade and provides an auxiliary lighting effect when a natural light source is not enough.

8 Claims, 6 Drawing Sheets

NATURAL LIGHT GUIDING SYSTEM USED FOR PLANT CULTIVATION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a natural light guiding system, and more particularly to a natural light guiding system used for plant cultivation, wherein the natural light guiding system guides natural light into a specific space for energy saving, providing a well-distributed light source and shortening a growing period of the cultivated plants.

2. Description of Related Art Including Information Disclosed Under 37 CFR 1.97 and 37 CFR 1.98

Due to the industrial development, climate variation, environmental pollution and overexploitation of the land, the safe and cultivatable land is gradually reduced. Consequently, a new plant cultivation method, which doesn't need a lot of cultivatable land, becomes more and more valued to green enterprises. The unconventional cultivating method includes the advantages of saving water and land. Furthermore, the weather does not influence the plants that are cultivated by the unconventional cultivating method such that the unconventional cultivating method can maximize production capacity relative to the conventional cultivating method.

However, the unconventional cultivating methods usually come into effect indoors. For overcoming the problem of sunlight, lights and an air conditioner are necessary. The LED is used to replace the conventional lights for saving energy, however, the power consumption is a considerable sum of energy.

The present invention has arisen to mitigate and/or obviate the disadvantages of the conventional plant cultivation apparatuses.

BRIEF SUMMARY OF THE INVENTION

The main objective of the present invention is to provide an improved a natural light guiding system used for plant cultivation, which guides natural light into a specific space for energy saving, providing a well-distributed light source and shortening a growing period of the cultivated plants.

To achieve the objective, natural light guiding system in accordance with the present invention comprises a chasing light and collecting light device and at least one lighting device connected to the chasing light and collecting light device. The at least one lighting device includes a lampshade is hollow and cone-shaped, wherein the cross-sectional area of the lampshade is gradually reduced relative to a height thereof. A top plate is mounted to a top of the lampshade and has at least one through hole defined therein. At least one optical fiber is connected to the chasing light and collecting light device. At least one collecting lens barrel is disposed on the top of the lampshade. A free ends of the at least one optical fiber is connected to the at least one collecting lens barrel. The at least one collecting lens barrel is disposed in the at least one through hole and projects light into the lampshade. The light from the at least one collecting lens barrel extends through a hollowed bottom of the lampshade. At least one LED light source is mounted onto an inner periphery of the lampshade. The at least one LED light source is electrically connected to a power source and provides an auxiliary lighting effect when a natural light source is not enough.

Further benefits and advantages of the present invention will become apparent after a careful reading of the detailed description with appropriate reference to the accompanying drawings.

DETAILED DESCRIPTION OF THE INVENTION

Figure 1:
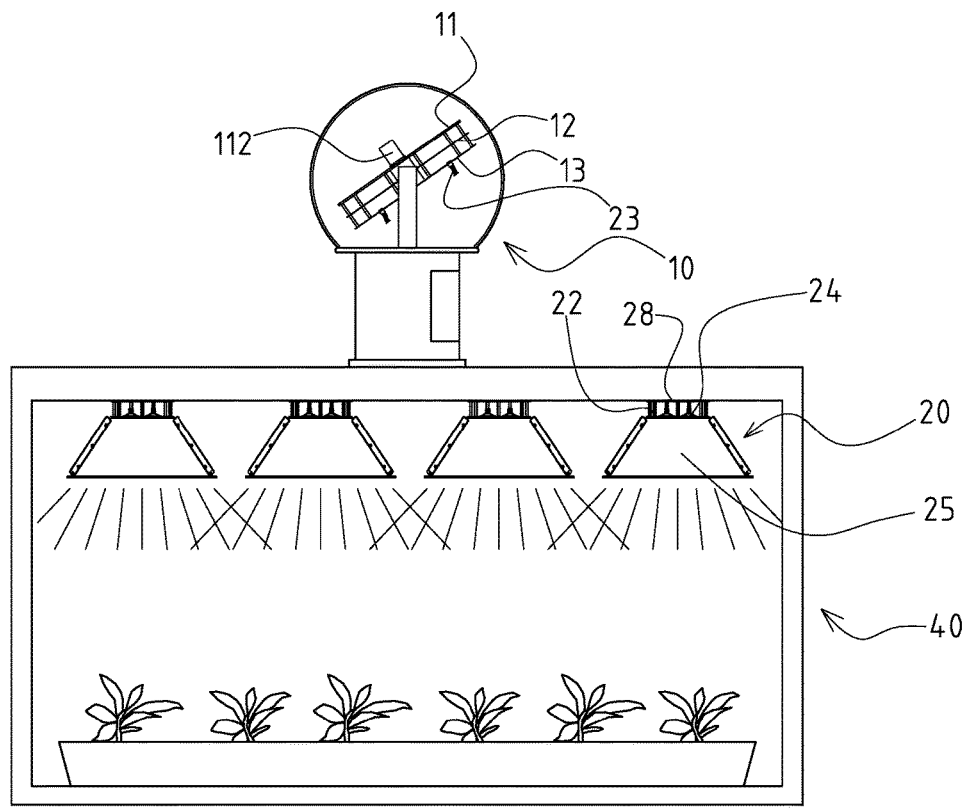
FIG. 1 is a schematic view of a natural light guiding system used for plant cultivation in accordance with the present invention.
Figure 2:
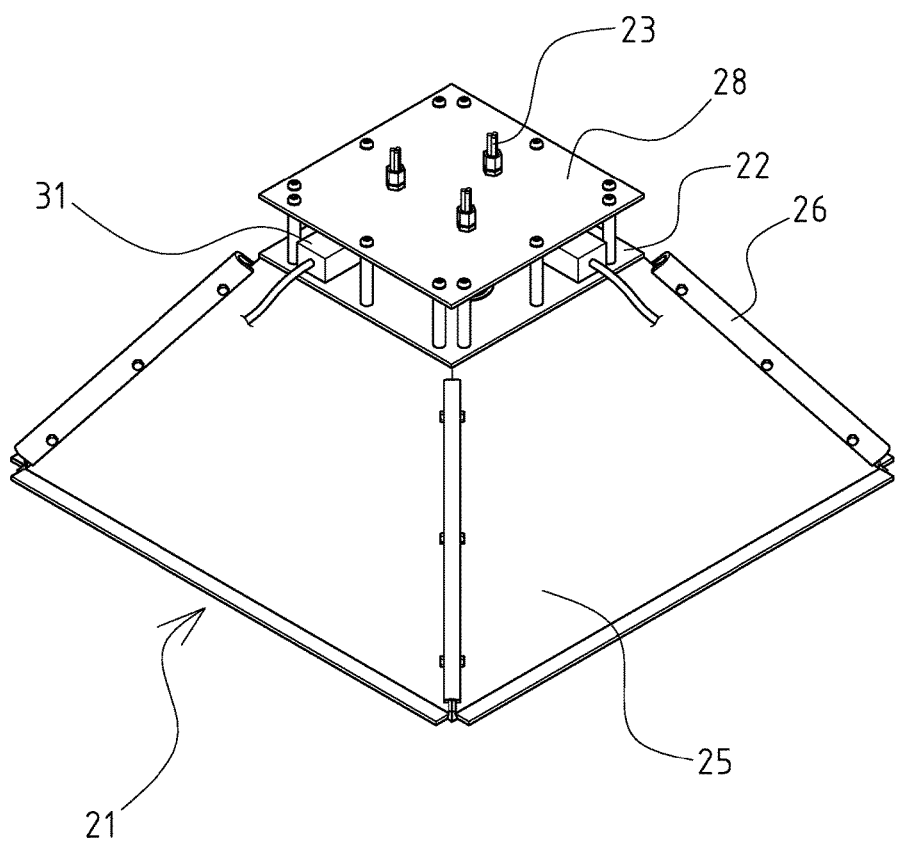
FIG. 2 is a perspective view of a lighting device of the natural light guiding system used for plant cultivation in accordance with the present invention.
Figure 2A:
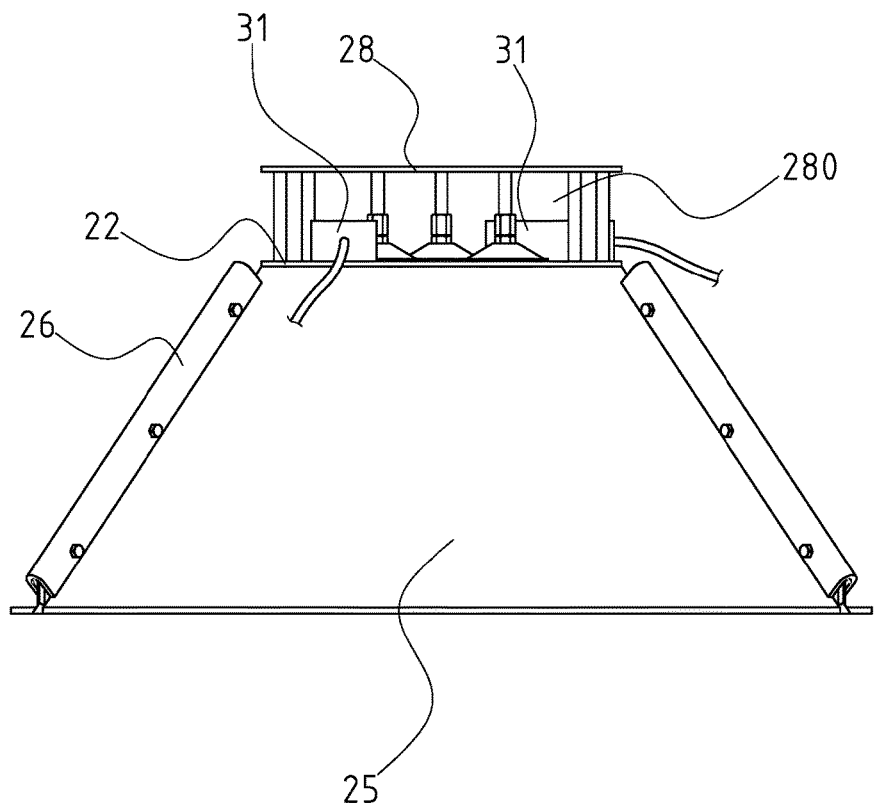
FIG. 2A is a front plan view of the lighting device of the natural light guiding system used for plant cultivation in accordance with the present invention.
Figure 3:
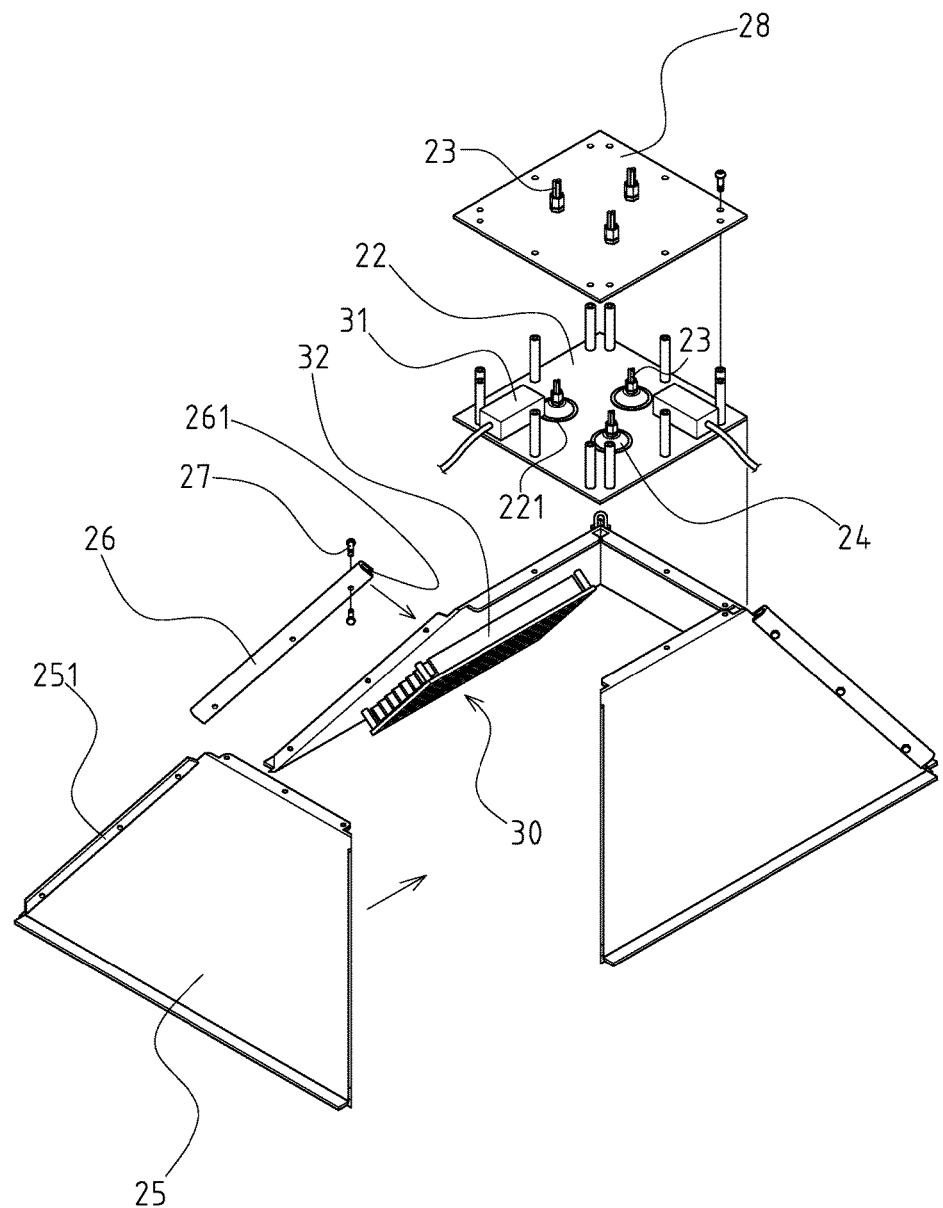
FIG. 3 is an exploded perspective view of the lighting device of the natural light guiding system used for plant cultivation in accordance with the present invention.
Figure 4:
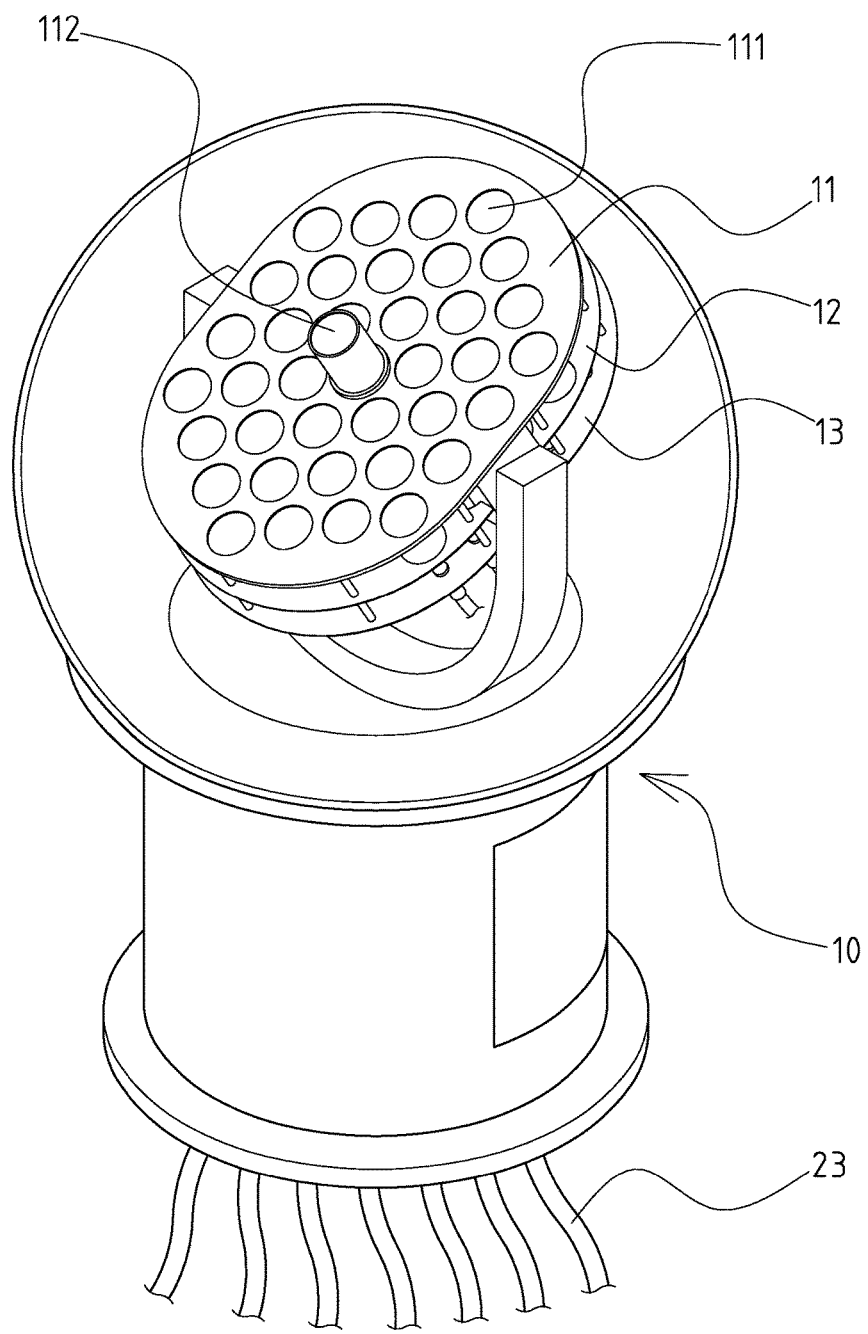
FIG. 4 is a perspective view of a chasing light and collecting light device of the natural light guiding system used for plant cultivation in accordance with the present invention.

Referring to the drawings and initially to FIGS. 1, 2, 2A, 3 and 4, a natural light guiding system used for plant cultivation in accordance with the present invention comprises a chasing light and collecting light device 10 and at least one lighting device 20 connected to the chasing light and collecting light device 10. The at least one lighting device 20 includes a lampshade 21 is hollow and cone-shaped, wherein the cross-sectional area of the lampshade 21 is gradually reduced relative to a height thereof. A top plate 22 is mounted to a top of the lampshade 21 and has at least one through hole 221 defined therein. At least one optical fiber 23 is connected to the chasing light and collecting light device 10. At least one collecting lens barrel 24 is disposed on the top of the lampshade 21. A free ends of the at least one optical fiber 23 is connected to the at least one collecting lens barrel 24. The at least one collecting lens barrel 24 is disposed in the at least one through hole 221 and projects light into the lampshade 21. The light from the at least one collecting lens barrel 24 extends through a hollowed bottom of the lampshade 21. At least one LED light source 30 is mounted onto an inner periphery of the lampshade 21. The at least one LED light source 30 is electrically connected to a power source and provides an auxiliary lighting effect when a natural light source is not enough.

The lampshade 21 is a pyramid structure and assembled by multiple modular trapezoidal plates 25. Each trapezoidal plate 25 has two bevel edges respectively having a connecting flange 251 formed thereon. Every two adjacent connecting flanges 251 abut and is secured to each other. The lampshade 21 further comprises multiple reinforcing members 26 each having a slot 261 longitudinally defined therein. The abutted connecting flanges 251 are received in a slot 261 of a corresponding one of the multiple reinforcing members 26 and secured by multiple bolts 27. The lampshade 31 further comprises a partition 28 disposed on the top plate 22, wherein the partition is separated from the top plate 22 such that a receiving space 280 is defined between the top plate 22 and the partition 28. The at least one LED light source 30 is electrically connected to at least one transformer 31, wherein the at least one transformer 31 is received in the receiving space 280 and electrically connected to a power source. In the preferred embodiment of the present invention, the number of the at least one LED light source 30 is two. The two LED light sources 30 are faced relative to each other. Each LED light source 30 has a back separated from the inner periphery of the lampshade 21 and each LED light source 30 has a series of fins 32 formed on the back thereof for providing a heat dissipation effect to each of the LED light source 30.

As described above, the trapezoidal plates 25 and the top plate 21 of the lampshade 21 are modularized such that the trapezoidal plates 25 and the top plate 21 are stacked up before being assembled and the total volume of the trapezoidal plates 25 and the top plate 21 is minimized for reducing the cost of the logistic the warehouse. Furthermore, the modularized trapezoidal plates 25 and top plate 21 have fool-proof designs such that the consumers can easily assemble the lampshade 21 and enjoy the pleasure of DIY (Do It Yourself).

Figure 5:
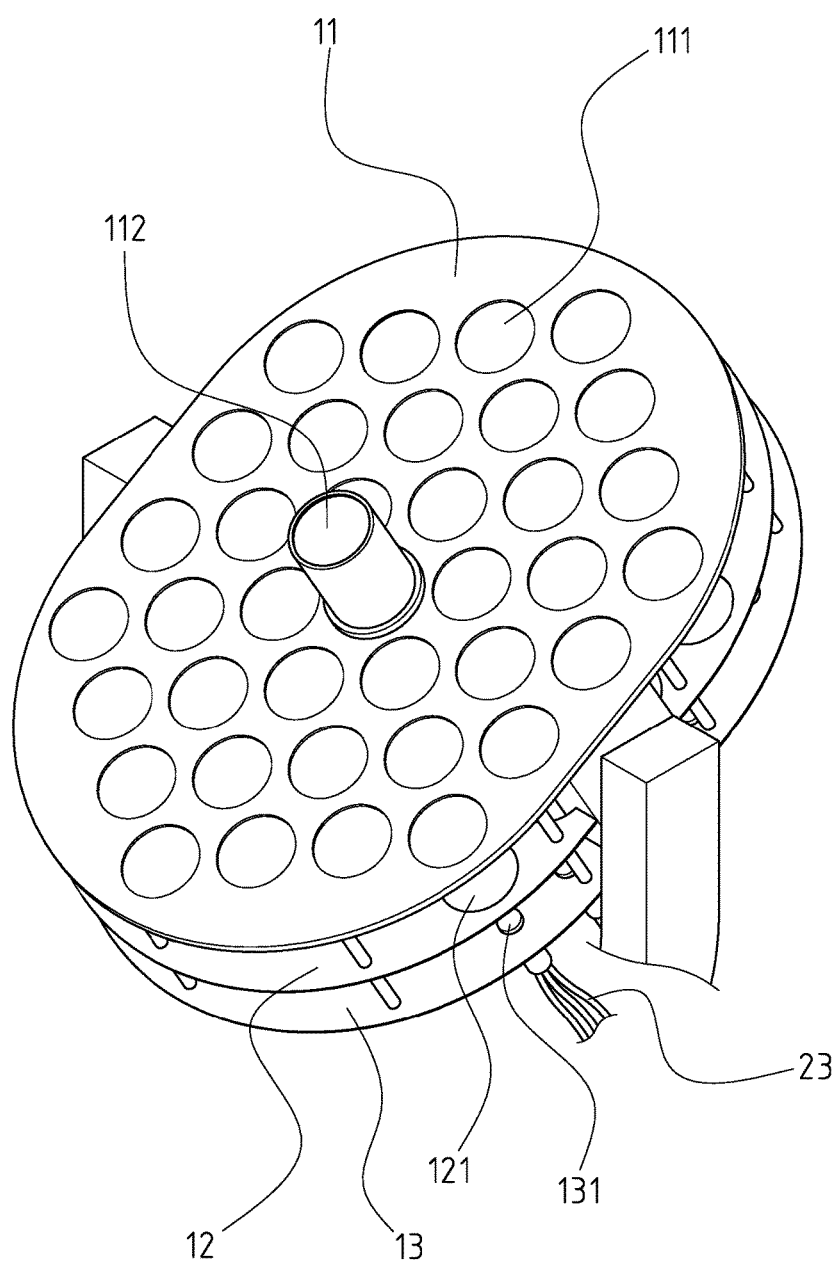
FIG. 5 is a partially perspective view of a chasing light and collecting light device of the natural light guiding system used for plant cultivation in accordance with the present invention.

In the preferred embodiment of the present invention, there are multiple lighting devices 20 and the lampshade 21 of each of the multiple lighting devices 20 has multiple collecting lens barrels 24 disposed thereon. Further with reference to FIG. 5, the chasing light and collecting light device 10 includes a first plate 11, a second plate 12 and a third plate 13 sequentially separated from one another. Multiple condensers 111 and an automatic tracking sensor 112 mounted onto first plate 11. The second plate 12 includes multiple through holes 121 defined therein, wherein each through hole 121 in the second plate 12 aligns with a corresponding one of the multiple condensers 11. The third plate 13 includes multiple concentrators 131 mounted thereon, wherein each concentrator 131 aligns with a corresponding one of the through holes 121 in the second plate 12 and each concentrator 131 has multiple optical fibers 23 connected thereon. Each concentrator 131 is connected to a corresponding one of the multiple collecting lens barrels 24.

With reference to FIGS. 1 to 5, the natural light guiding system in accordance with the present invention is coupled with a container 40 for cultivating plants with thinking over the environmental factors. The chasing light and collecting light device 10 is mounted on a rooftop of the container 40. The chasing light and collecting light device 10 adjusts a direction and an elevation angle of the first plate 11 due to the direction and the elevation angle of the natural light (sun light) via the automatic tracking sensor 112 and a drive device (not shown) in the chasing light and collecting light device 10. The optical fiber 23 used in the natural light guiding system in accordance with the present invention can initiatively filter of the ray that has a wavelength from 200 μm to 900 μm such that the ultraviolet rays and the far-infrared in the sun light is filtered out and only the rays, beneficial to the plants, is reserved and provided to the plants in the container 40. Multiple lighting devices 20 are mounted onto a ceiling of the container 40. The collecting lens barrel 24 of each of the multiple lighting devices 20 is connected corresponding one of the concentrators 131 by the multiple optical fibers 23. The multiple optical fibers 23, connecting the multiple concentrators 131 and the multiple collecting lens barrels 24, transmit the natural light from the multiple concentrators 131 to the multiple collecting lens barrels 24 and projecting into the container 40 to make the plants, in the container 40, going photosynthesis. The plants can continually grow in the container 40 by using auxiliary lighting device when the weather is bad, the sun light is not enough or the plants are irrigating plants. In the preferred embodiment of the present invention, the auxiliary lighting device is the at least one LED light source 30. Furthermore, the natural light is collected by the chasing light and collecting light device 10 and transmitted to the lighting device 20 such that the plants, in the container 40, grow like under a natural environment.

As described above, the natural light guiding system in accordance with the present invention is coupled with a container 40 for cultivating plants in large amounts. However, the natural light guiding system in accordance with the present invention can be minimized and used indoors. The plants can be cultivated in a room that has a not good daylighting. As a result, the degree of greening in the house is promoted and the lighting device 20 can further used as a light source for indoor lighting for providing an energy saving effect.

In addition, with reference to FIG. 1, the cross-sectional area of the lampshade 21 is gradually reduced relative to a height thereof such that the light will partially be overlapped after extending through the hollowed bottom of the lampshade 21 for providing an equal lighting effect to the cultivated plants.

Although the invention has been explained in relation to its preferred embodiment, it is to be understood that many other possible modifications and variations can be made without departing from the spirit and scope of the invention as hereinafter claimed.

I claim:

1. A natural light guiding system used for plant cultivation, comprising a chasing light and collecting light device and at least one lighting device connected to the chasing light and collecting light device, wherein the at least one lighting device includes:

a hollow lampshade, wherein the cross-sectional area of the lampshade is gradually reduced relative to a height thereof, a top plate mounted to a top of the lampshade and having at least one through hole defined therein; the lampshade being a pyramid structure and assembled by multiple modular trapezoidal plates, each trapezoidal plate having two bevel edges respectively having a connecting flange formed thereon, wherein every two adjacent connecting flanges abut and is secured to each other;

at least one optical fiber connected to the chasing light and collecting light device;

at least one collecting lens barrel disposed on the top of the lampshade, a free ends of the at least one optical fiber connected to the at least one collecting lens barrel, the at least one collecting lens barrel disposed in the at least one through hole and projecting light into the lampshade, the light from the at least one collecting lens barrel extending through a hollowed bottom of the lampshade;

at least one LED light source mounted onto an inner periphery of the lampshade, the at least one LED light source electrically connected to a power source and providing an auxiliary lighting effect when a natural light source is not enough.

2. The natural light guiding system used for plant cultivation as claimed in claim 1, wherein the lampshade comprises multiple reinforcing members each having a slot longitudinally defined therein, the abutted connecting flanges received in a slot of a corresponding one of the multiple reinforcing members and secured by multiple bolts.

3. The natural light guiding system used for plant cultivation as claimed in claim 1, wherein the lampshade comprises a partition disposed on the top plate and the partition is separated from the top plate such that a receiving space is defined between the top plate and the partition; the at least one LED light source electrically connected to at least one transformer, wherein the at least one transformer is received in the receiving space and electrically connected to a power source.

4. The natural light guiding system used for plant cultivation as claimed in claim 2, wherein the lampshade comprises a partition disposed on the top plate and the partition is separated from the top plate such that a receiving space is defined between the top plate and the partition; the at least one LED light source electrically connected to at least one transformer, wherein the at least one transformer is received in the receiving space and electrically connected to a power source.

5. The natural light guiding system used for plant cultivation as claimed in claim 3, wherein the at least one LED light source has a back separated from the inner periphery of the lampshade and the at least one LED light source has a series of fins formed on the back thereof for providing a heat dissipation effect to each of the LED light source.

6. The natural light guiding system used for plant cultivation as claimed in claim 4, wherein the at least one LED light source has a back separated from the inner periphery of the lampshade and the at least one LED light source has a series of fins formed on the back thereof for providing a heat dissipation effect to each of the LED light source.

7. The natural light guiding system used for plant cultivation as claimed in claim 5, wherein there are multiple lighting devices and the lampshade of each of the multiple lighting devices has multiple collecting lens barrels disposed thereon, and wherein the chasing light and collecting light device includes a first plate, a second plate and a third plate sequentially separated from one another, multiple condensers and an automatic tracking sensor mounted onto first plate, the second plate including multiple through holes defined therein, wherein each through hole in the second plate aligns with a corresponding one of the multiple condensers, the third plate including multiple concentrators mounted thereon, wherein each concentrator aligns with a corresponding one of the through holes in the second plate and each concentrator has multiple optical fibers connected thereon, each concentrator connected to a corresponding one of the multiple collecting lens barrels.

8. The natural light guiding system used for plant cultivation as claimed in claim 6, wherein there are multiple lighting devices and the lampshade of each of the multiple lighting devices has multiple collecting lens barrels disposed thereon, and wherein the chasing light and collecting light device includes a first plate, a second plate and a third plate sequentially separated from one another, multiple condensers and an automatic tracking sensor mounted onto first plate, the second plate including multiple through holes defined therein, wherein each through hole in the second plate aligns with a corresponding one of the multiple condensers, the third plate including multiple concentrators mounted thereon, wherein each concentrator aligns with a corresponding one of the through holes in the second plate and each concentrator has multiple optical fibers connected thereon, each concentrator connected to a corresponding one of the multiple collecting lens barrels.

\* \* \* \* \*